US012072061B2

United States Patent
Lehmann et al.

(10) Patent No.: US 12,072,061 B2
(45) Date of Patent: Aug. 27, 2024

(54) ATOMIZER UNIT OF A MINIMAL QUANTITY LUBRICATION SYSTEM

(71) Applicant: Broetje-Automation GmbH, Rastede (DE)

(72) Inventors: Marc Lehmann, Westerstede (DE); Henning Frers, Wiefelstede (DE); Sebastian Jostmann, Oldenburg (DE)

(73) Assignee: Broetje-Automation GmbH, Rastede (DE)

( * ) Notice: Subject to any disclaimer, the term of this patent is extended or adjusted under 35 U.S.C. 154(b) by 789 days.

(21) Appl. No.: 17/053,142

(22) PCT Filed: May 8, 2019

(86) PCT No.: PCT/EP2019/061822
§ 371 (c)(1),
(2) Date: Nov. 5, 2020

(87) PCT Pub. No.: WO2019/215232
PCT Pub. Date: Nov. 14, 2019

(65) Prior Publication Data
US 2021/0239267 A1 Aug. 5, 2021

(30) Foreign Application Priority Data
May 8, 2018 (DE) ............ 10 2018 111 083.9

(51) Int. Cl.
*F16N 7/34* (2006.01)
*B05B 1/08* (2006.01)
(Continued)

(52) U.S. Cl.
CPC ............ *F16N 7/34* (2013.01); *B05B 1/083* (2013.01); *B05B 7/0012* (2013.01); *B05B 7/0475* (2013.01); *B05B 7/0491* (2013.01)

(58) Field of Classification Search
CPC .. F16N 7/34; B05B 7/045; B05B 7/12; B05B 7/0491; B05B 7/0475; B05B 7/0012; B23Q 11/1046
See application file for complete search history.

(56) References Cited

U.S. PATENT DOCUMENTS 2,113,506 A * 4/1938 Clough ............ F16N 7/34
239/428
2,969,748 A * 1/1961 Staats ............ F04F 5/461
417/186
(Continued)

FOREIGN PATENT DOCUMENTS

| CN | 203292942 | 11/2013 | |
|---|---|---|---|
| CN | 103037976 B * | 11/2015 | ........ B01J 2/04 |

(Continued)

OTHER PUBLICATIONS

"German Search Report," for German Patent Application No. 102018111083.9 mailed Aug. 22, 2018 (9 pages).
(Continued)

*Primary Examiner* — Michael A Riegelman
(74) *Attorney, Agent, or Firm* — Pauly, DeVries Smith & Deffner LLC

(57) ABSTRACT

An atomizer unit of a lubrication system has a chamber arrangement having a chamber arrangement interior, at least one first supply duct for supplying a first compressed-air stream into and through the chamber arrangement interior to a continuation duct, and an injection valve for injecting a coolant and/or lubricant into an injection region into the first compressed-air stream in the chamber arrangement interior. The atomizer unit has at least one second supply duct for supplying a second compressed-air stream into and through the chamber arrangement interior to the continuation duct. The atomizer unit is designed in such a manner that the second compressed-air stream combines with the first com-
(Continued)

pressed-air stream and with the coolant and/or lubricant possibly injected into the first compressed-air stream, to form a transport stream for transporting the injected coolant and/or lubricant, and the transport stream is routed through the continuation duct to the machining location.

19 Claims, 5 Drawing Sheets

(51) Int. Cl.
*B05B 7/00* (2006.01)
*B05B 7/04* (2006.01)

(56) References Cited

U.S. PATENT DOCUMENTS

| | | | | |
|---|---|---|---|---|
| 3,561,680 | A * | 2/1971 | Ott | B05B 7/045 239/570 |
| 3,696,889 | A * | 10/1972 | Brake | F16N 7/34 184/55.2 |
| 4,527,661 | A * | 7/1985 | Johnstone | F16C 33/6674 384/468 |
| 4,597,526 | A * | 7/1986 | Egli | B21B 45/0248 239/290 |
| 5,226,506 | A * | 7/1993 | Link | F16L 7/02 239/419 |
| 8,048,830 | B1 * | 11/2011 | Jackson | C10M 125/00 508/154 |
| 9,303,813 | B2 * | 4/2016 | Rapchak | F16N 7/32 |
| 9,573,147 | B1 * | 2/2017 | Yeates | A61M 11/001 |
| 10,898,912 | B2 * | 1/2021 | Hoxie | F23D 11/38 |
| 2005/0242209 | A1 * | 11/2005 | Holm | B05B 7/066 239/455 |
| 2007/0057083 | A1 * | 3/2007 | Bolz | B05B 7/0012 239/398 |
| 2013/0206441 | A1 * | 8/2013 | Roser | B23Q 11/1046 173/199 |
| 2017/0280775 | A1 * | 10/2017 | Manca | A24F 40/485 |
| 2021/0239267 | A1 * | 8/2021 | Lehman | B05B 7/0491 |
| 2022/0390067 | A1 * | 12/2022 | Lehman | B05B 1/083 |
| 2023/0020961 | A1 * | 1/2023 | Manca | B05B 7/0012 |

FOREIGN PATENT DOCUMENTS

| | | | | |
|---|---|---|---|---|
| CN | 105457777 A | * | 4/2016 | A01B 79/005 |
| DE | 19721650 | | 11/1998 | |
| DE | 19829769 | | 1/2000 | |
| DE | 29724651 | | 8/2002 | |
| DE | 10222863 | | 11/2003 | |
| DE | 102004034689 | | 8/2005 | |
| DE | 102005044603 | | 4/2006 | |
| DE | 69938068 | | 3/2008 | |
| DE | 102007008227 | | 8/2008 | |
| DE | 202009017656 | | 5/2011 | |
| DE | 102015213536 | | 11/2016 | |
| DE | 102016115039 | | 3/2018 | |
| EP | 0535271 | | 4/1993 | |
| WO | 2018029013 | | 2/2018 | |
| WO | 2019215232 | | 11/2019 | |

OTHER PUBLICATIONS

"International Preliminary Report on Patentability," for PCT Application No. PCT/EP2019/061822 dated Nov. 10, 2020 (9 pages).
"International Search Report and Written Opinion," for PCT Application No. PCT/EP2019/061822 mailed Jun. 18, 2019 (12 pages).

* cited by examiner

ATOMIZER UNIT OF A MINIMAL QUANTITY LUBRICATION SYSTEM

CROSS-REFERENCE TO RELATED APPLICATIONS

This application is a national stage application under 35 U.S.C. 371 of International Patent Application Serial No. PCT/EP2019/061822, entitled "Atomizer Unit of a Minimal Quantity Lubrication System," filed May 8, 2019, which claims priority from German Patent Application No. DE 10 2018 111 083.9, filed May 8, 2018, the disclosure of which is incorporated herein by reference.

FIELD OF TECHNOLOGY

The disclosure relates to an atomizer unit of a minimal-quantity lubrication system for cooling and/or lubricating a chip-removing machining process between a tool and a workpiece at a machining location, to a minimal-quantity lubrication system, to a machining installation, and to a method for operating an atomizer unit and/or a minimal-quantity lubrication installation and/or a machining installation.

BACKGROUND

In many chip-removing machining processes it is advantageous to provide cooling and/or lubrication at the machining location, between a tool and a workpiece. Such cooling and/or lubrication can usually considerably increase process reliability. The machining quality as well as the service life of the tool can be increased, and the temperature input into the workpiece reduced.

At the same time, however, the costs for the respective coolant and/or lubricant are to be kept low, and unnecessary release of coolant and/or lubricant into the environment is to be avoided. In addition, cleaning of coolant and/or lubricant from the workpiece after machining is to be avoided insofar as possible. The resource requirement for cleaning increases considerably with the size of the workpiece, in particular if the workpiece is only partially machined in many places. This applies in particular to aircraft structural components, where a plurality of workpiece parts are joined together by drilling and riveting. In order to reduce the amount of coolant and/or lubricant used in the chip-removing machining process, so-called minimal-quantity lubrication systems have been developed.

Known from DE 20 2009 017 656 U1, for example, is such a minimal-quantity lubrication system for machining, in which the coolant and/or lubricant is sprayed into a chamber by means of a high-pressure nozzle, and is transported to the machining location by means of a compressed-air stream. This system may be realized as a single-duct minimal-quantity lubrication system, in which the aerosol is generated outside of the spindle of a machining installation and is transported through the spindle and the tool to the machining location by means of a single-duct guide, or as a dual-duct minimal-quantity lubrication system, in which the aerosol is generated inside the spindle, and compressed air and the coolant and/or lubricant is supplied to the spindle by means of separate lines.

Also known are external minimal-quantity lubrication systems, which do not guide the coolant and/or lubricant through the spindle and the tool to the machining location, but outside of the tool.

The system described in DE 20 2009 017 656 U1 has already improved reaction times compared to other minimal-quantity lubrication systems, at least in the variants as a dual-duct minimal-quantity lubrication system, and can react more flexibly to changing requirements. In these variants it is arranged in the spindle. However, there is still a need for further optimization in respect of reaction time and adjustability, in particular for machining installations where, for reasons of structural space, aerosol generation in the spindle is not possible.

SUMMARY

The present disclosure is therefore based on the problem of improving the reaction time as well as the adaptation to changing conditions and the quantity of the coolant and/or lubricant to be used, in particular in the case of small spindles.

The problem stated above is solved, in the case of an atomizer unit of a minimal-quantity lubrication system according to the disclosure.

The atomizer unit of a minimal-quantity lubrication system for cooling and/or lubricating a chip-removing machining process between a tool and a workpiece at a machining location has, as proposed, a chamber arrangement having a chamber arrangement interior, at least one first supply duct for supplying a first compressed-air stream into and through the chamber arrangement interior to a continuation duct, and an injection valve for injecting a coolant and/or lubricant into an injection region into the first compressed-air stream in the chamber arrangement interior, and at least one second supply duct for supplying a second compressed-air stream into and through the chamber arrangement interior to the continuation duct. The atomizer unit in this case is designed in such a manner that, downstream of the injection region, the second compressed-air stream combines with the first compressed-air stream and with the coolant and/or lubricant possibly injected into the first compressed-air stream, to form a transport stream for transporting the injected coolant and/or lubricant, and the transport stream is routed through the continuation duct to the machining location.

The injecting of the coolant and/or lubricant into the first compressed-air stream and the subsequent combining of the first and second compressed-air stream allows a particularly homogeneous distribution and low concentration in the transport stream, and thus a particularly precise and uniform, flexibly adjustable supply of coolant and/or lubricant to the machining location. Furthermore, it is possible to react rapidly to changes in requirement by changing the injection parameters. This is particularly advantageous, in particular, in the case of drilling processes in which comparatively flat holes or comparatively thin workpieces are drilled through, since in these cases aerosol is required only for very short periods of time. This advantage is enhanced, in particular, if the workpiece is a hybrid workpiece composed of different materials, in particular layers of different materials.

Various embodiments describe developments relating to the design of the chamber arrangement having an injection chamber and/or atomizer chamber, as well as to the injection and atomization of the coolant and/or lubricant to produce a particularly homogeneous and, if appropriate, low-concentration aerosol.

According to some embodiments, the injection valve is a high-pressure injection valve and/or can be triggered in a pulse-like manner. This makes it possible to achieve a particularly flexible and fast-reaction dosing with high homogeneity.

An even better atomization effect can be achieved, in particular, if the passage opening of the nozzle does not exceed the size specified herein.

In addition, in the case of a minimal-quantity lubrication system according to to some embodiments, the problem described at the outset is solved by the features thereof.

The minimal-quantity lubrication system may in this case have all the features described in connection with the atomizer unit, either individually or in combination. The same advantages result as described in connection with the atomizer unit.

The development according to various embodiments relates to developments of the minimal-quantity lubrication system and, in particular in this case, of the pressures of the coolant and/or lubricant, or of the compressed air provided to the first or second supply duct when the transport stream has been established.

In addition, the problem described at the outset is solved, in the case of a machining installation, by the features described herein.

The machining installation in this case has the features described in connection with the atomizer unit and/or the minimal-quantity lubrication system, individually and/or in combination. The same advantages result as described in connection with the atomizer unit and the minimal-quantity lubrication system.

Various designs of the machining installation, in particular relating to the spindle and the atomizer unit, are described herein.

Finally, the problem explained at the outset is solved in respect of method by the features described herein. The same advantages result as described above in connection with the atomizer unit, the minimal-quantity lubrication system and/or the machining installation.

In the case of the method, an atomizer unit and/or a minimal-quantity lubrication system and/or a machining installation as described here may be used.

Various embodiments provide an atomizer unit of a minimal-quantity lubrication system for cooling and/or lubricating a chip-removing machining process between a tool and a workpiece at a machining location, wherein the atomizer unit has a chamber arrangement having a chamber arrangement interior, at least one first supply duct for supplying a first compressed-air stream into and through the chamber arrangement interior to a continuation duct, and an injection valve for injecting a coolant and/or lubricant into an injection region into the first compressed-air stream in the chamber arrangement interior, wherein the atomizer unit has at least one second supply duct for supplying a second compressed-air stream into and through the chamber arrangement interior to the continuation duct, wherein the atomizer unit is designed in such a manner that, downstream of the injection region, the second compressed-air stream combines with the first compressed-air stream and with the coolant and/or lubricant possibly injected into the first compressed-air stream, to form a transport stream for transporting the injected coolant and/or lubricant, and wherein the transport stream is routed through the continuation duct to the machining location.

In various embodiments, the chamber arrangement has an injection chamber, into the interior of which the coolant and/or lubricant is injected through the injection valve, and wherein the injection chamber comprises the injection region, and wherein the interior of the injection chamber forms part of the chamber arrangement interior, and/or, in that the chamber arrangement has an atomizer chamber into the interior of which the coolant and/or lubricant is atomized, wherein the interior of the atomizer chamber forms part of the chamber arrangement interior, such as the atomizer chamber is arranged downstream of the injection chamber.

In various embodiments, the injection chamber and the atomizer chamber are separated from each other by a nozzle for atomization, such as the first compressed-air stream, possibly with the injected coolant and/or lubricant, flows through the nozzle from the injection chamber into the atomizer chamber, such as the first compressed-air stream conveys the injected coolant and/or lubricant through the nozzle and thus atomizes it.

In various embodiments, the first compressed-air stream conveys the coolant and/or lubricant injected into it through the nozzle, and the coolant and/or lubricant is atomized, such as atomized into the second compressed-air stream.

In various embodiments, the injection valve is a-high pressure injection valve, in particular a direct petrol injection valve.

In various embodiments, the injection valve is triggered in a pulse-like manner, such as the open period of the injection valve is shorter than the time between two openings of the injection valve.

In various embodiments, the passage opening width of the passage opening of the nozzle is a maximum of 0.5 mm, a maximum of 0.3 mm, or a maximum of 0.2 mm.

Various embodiments provide a minimal-quantity lubrication system having an atomizer unit as described herein, having a coolant and/or lubricant source for supplying the injection valve with coolant and/or lubricant, and having a compressed-air source arrangement for supplying the first and/or second supply duct with compressed air.

In various embodiments, the coolant and/or lubricant is provided by the coolant and/or lubricant source at a pressure of 50 to 250 bar, such as of 80 to 220 bar, of 100 to 200 bar, of 130 to 170 bar, or of 150 bar, and/or that compressed air is provided to the first supply duct at a pressure of 3 to 8 bar, of 4 to 7 bar, or of 6 bar, when the transport stream has been established, and/or that compressed air is provided to the second supply duct at a pressure of 8 to 15 bar, of 9 to 13 bar, or of 11 bar, when the transport stream has been established.

In various embodiments, the first supply duct is supplied with compressed air at a higher pressure than the second supply duct, such as the pressure difference of the pressure provision is 2 to 8 bar, 4 to 6 bar, or 5 bar.

Various embodiments provide a machining installation for chip-removing machining of a workpiece, wherein the machining installation has a tool and an atomizer unit as described herein and/or a minimal-quantity lubrication system as described herein.

In various embodiments, the machining installation has a spindle having a tool receiver, and that the continuation duct runs, in particular straight, from the atomizer unit, through the spindle and the tool, to the machining location.

In various embodiments, the atomizer unit is arranged in front of the spindle in the direction of flow of the transport stream, such as the flow path from the atomizer unit to the spindle is less than 50 cm, less than 20 cm, or less than 10 cm.

In various embodiments, the machining installation is a drilling machine, in particular a drilling/riveting machine, and that the tool is a drill bit.

In various embodiments, the machining installation has an end effector in which the spindle is arranged, and that the compressed-air source and/or the coolant and/or lubricant source are/is arranged at a distance from the end effector.

Various embodiments provide a method for operating an atomizer unit, in particular as described herein, and/or a minimal-quantity lubrication installation, in particular as described herein, and/or a machining installation, in particular as described herein, wherein a first compressed-air stream is routed, through a first supply duct, into and through a chamber arrangement interior of a chamber arrangement of an atomizer unit to a continuation duct, and a coolant and/or lubricant is injected, through an injection valve, into an injection region of the chamber arrangement interior into the first compressed-air stream, wherein a second compressed-air stream is routed through a second supply duct into and through the chamber arrangement interior of the chamber arrangement of an atomizer unit to a continuation duct, wherein the second compressed-air stream and the first compressed-air stream, and possibly the second compressed-air stream, are combined in the atomizer unit to form second supply duct and are routed through the continuation duct to the machining location.

BRIEF DESCRIPTION OF THE DRAWINGS

The disclosure is explained in greater detail in the following on the basis of a drawing that represents only an exemplary embodiment. The drawing shows FIG. 1 a schematic representation of a proposed machining installation having a proposed atomizer unit of a proposed minimal-quantity lubrication system, FIG. 2 in schematic representation an exemplary embodiment of a proposed minimal-quantity lubrication system comprising the proposed atomizer unit from FIG. 1, in a three-dimensional external view, FIG. 3 a section through the atomizer unit of the exemplary embodiment according to view III-III of FIG. 2, and an enlarged detailed view of the section, FIG. 4 a flow diagram of a chip-removing machining process, and FIG. 5 a tool and a workpiece in different relative positions.

DETAILED DESCRIPTION

Figure 1:
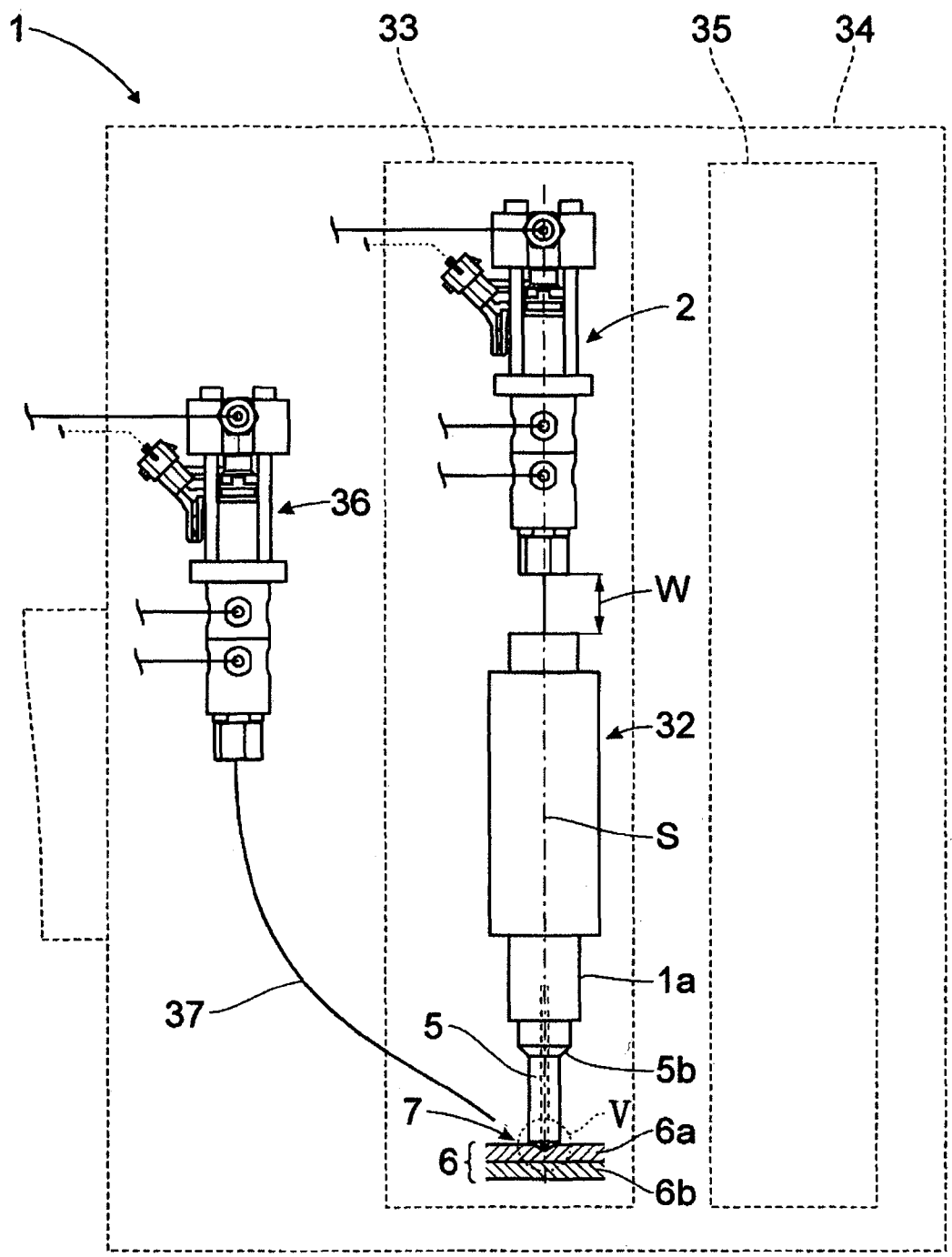

Shown schematically in FIG. 1 is a proposed machining installation 1 having a proposed atomizer unit 2 of a proposed minimal-quantity lubrication system 3.

Here, the minimal-quantity lubrication system 3 is suitable and/or configured to consume equal to or less than (in total) 50 ml of coolant and/or lubricant per hour in the chip-removing machining process. Here, a maximum of 50 ml, a maximum of 40 ml, or a maximum of 30 ml, of coolant and/or lubricant are consumed per hour in the chip-removing machining process.

Figure 2:
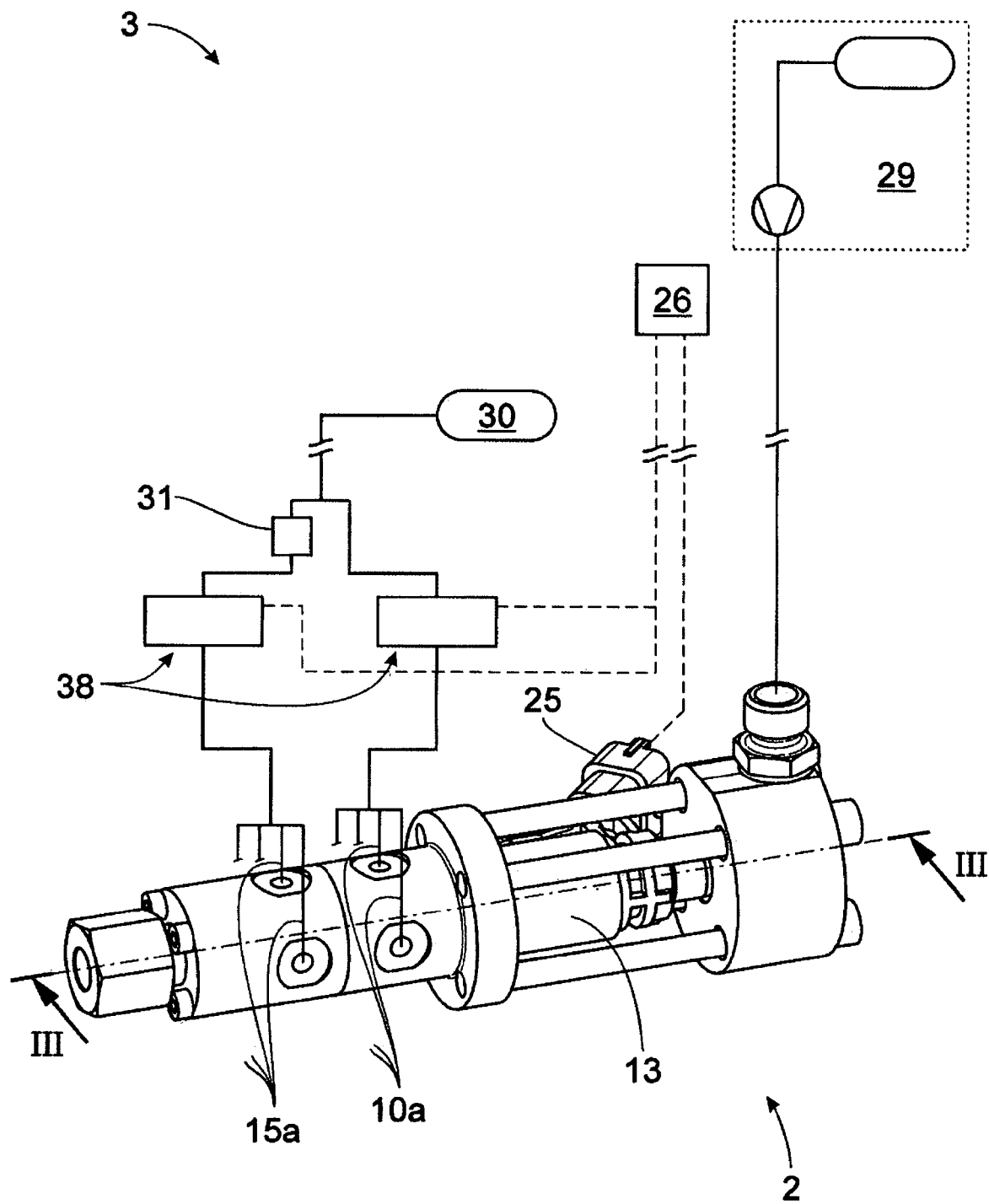
Figure 3:
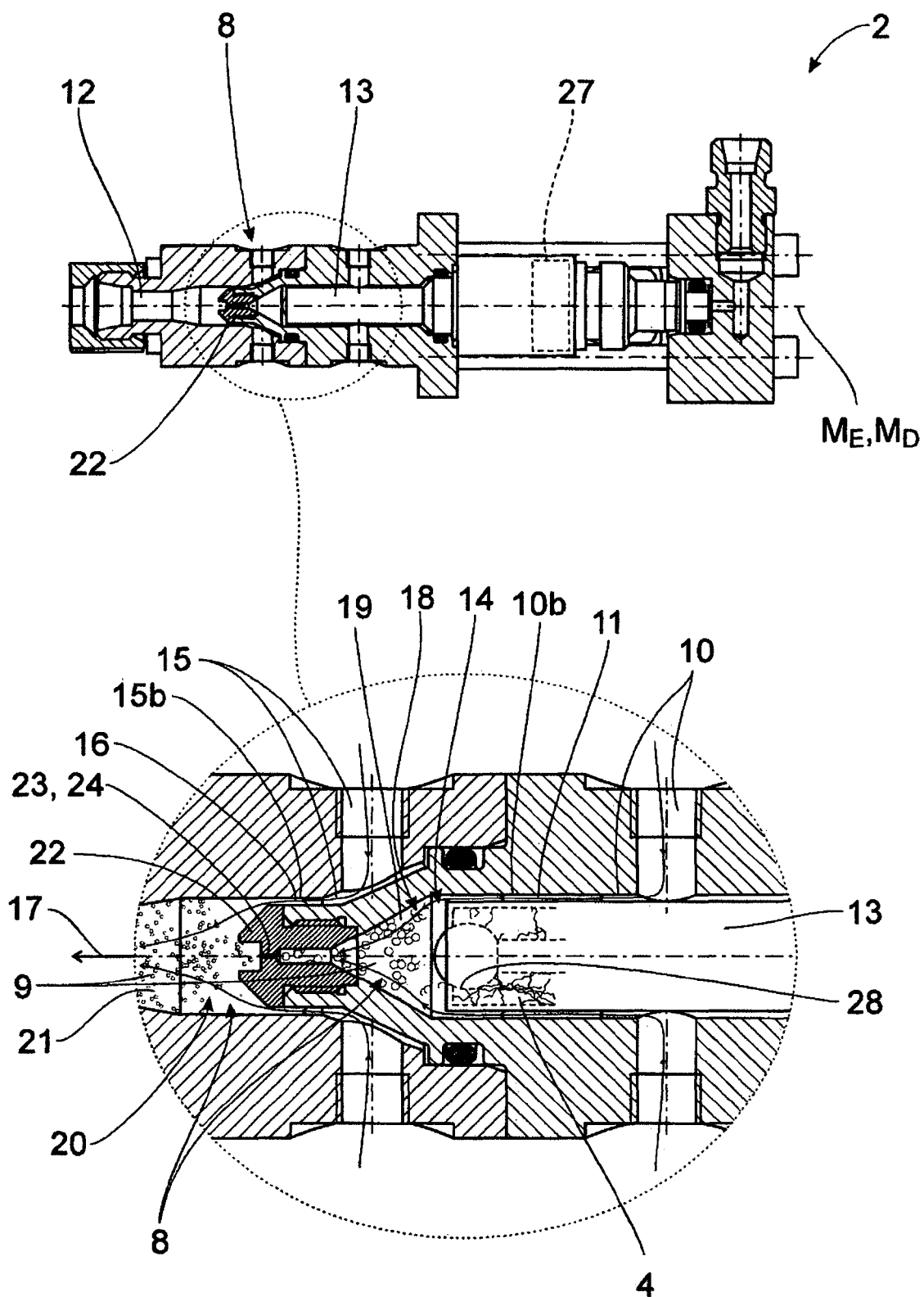

The functioning of the atomizer unit 2 is to be explained on the basis FIG. 3, which shows the atomizer unit in section according to III-III of FIG. 2.

The atomizer unit 2 serves to provide a coolant and/or lubricant 4 for cooling and/or lubricating a chip-removing machining process between a tool 5 and a workpiece 6 at a machining location 7. The tool 5 may be a machining tool 5, here a drill bit. The workpiece 6 here is a structural component, in particular an aircraft structural component. Aircraft structural components are, for example, fuselage sections and/or wing sections of an aircraft. The workpiece 6 may consist of a plurality of workpiece parts 6a, 6b. Here, they are drilled-through jointly and then riveted together.

The proposed atomizer unit 2 has a chamber arrangement 8 having a chamber arrangement interior 9, at least one first supply duct 10 for supplying a first compressed-air stream 11 into and through the chamber arrangement interior 9 to a continuation duct 12, and an injection valve 13 for injecting a coolant and/or lubricant 4 into an injection region 14 into the first compressed-air stream 11 in the chamber arrangement interior 9.

As proposed, the atomizer unit 2 has at least one second supply duct 15 for supplying a second compressed-air stream 16 into and through the chamber arrangement interior 9 to the continuation duct 12. The atomizer unit 2 in this case is designed in such a manner that, downstream of the injection region 14, the second compressed-air stream 16 combines with the first compressed-air stream (11) and with the coolant and/or lubricant possibly injected into the first compressed-air stream 11, to form a transport stream 17 for transporting the injected coolant and/or lubricant 4, and the transport stream 17 is routed through the continuation duct 12 to the machining location 7.

The injection of the coolant and/or lubricant 4 into the first compressed-air stream 11 and the subsequent downstream addition of a second compressed-air stream 16 renders possible a homogeneous distribution of the coolant and/or lubricant 4 at low concentration in the transport stream 17. An aerosol of compressed air and coolant and/or lubricant 4 can be produced. This is advantageous, in particular, in the case of short chip-removing machining processes such as, for example, drilling. Such short chip-removing machining processes occur, in particular, in the drilling of aircraft structural components and, if appropriate, subsequent riveting.

In addition, this structural design of the atomizer unit 2 allows short reaction times for switching the aerosol on and off for the chip-removing machining process. As a result of the coolant and/or lubricant 4 being injected and/or atomized with the transport stream 17, an aerosol is formed that flows through the continuation duct to the machining location 7, where it cools and/or lubricates the chip-removing machining process.

An aerosol is understood to be a colloidal system of gas (here the compressed air) having small solid and/or liquid particles (suspended particles, here the coolant and/or lubricant) distributed in it. Here, they are liquid particles. The particles can have diameters of $10^{-7}$ to $10^{-3}$ cm. In the exemplary embodiment, the coolant and/or lubricant has a kinematic viscosity of $9*10^{-6}$ m$^2$/s.

In the exemplary embodiment, the chamber arrangement 8, as shown in the enlarged representation of FIG. 3, optionally has an injection chamber 18, into the interior 19 of which the coolant and/or lubricant 4 is injected through the injection valve 13, and the injection chamber 18 comprising the injection region 14. In the exemplary embodiment, the injection chamber 18 forms the injection region 14.

In the exemplary embodiment, the first compressed-air stream 11 flows through a plurality of first partial supply ducts 10a, here four, into the atomizer unit 2. Here, these are combined in the atomizer unit 2 to form a first main supply duct 10b. Here, the supply of the first compressed-air stream 11 to the injection chamber 18 is effected in a radial direction around the injection valve 13, or the outlet of the injection valve 13. In some embodiments, at least one directional component of the first compressed-air stream 11, when entering the injection chamber 18, runs in the main injection direction of the coolant and/or lubricant 4. Here, the first compressed-air stream 11, immediately before entering the injection chamber 18, runs substantially parallel to the main injection direction of the coolant and/or lubricant 4.

Here, the injection valve 13 is a high-pressure injection valve, in particular a direct petrol injection valve. This is known from the automotive sector and has proven to be reliable. The injection valve 13 can be triggered electrically. Here, it is supplied with a voltage of 48 V. It has an electrical connection 25 for triggering and/or voltage supply. This can be connected to a control arrangement 26. For the purpose of opening and/or closing the injection valve 13, here it has an electromagnet 27 and/or a piezo-actuator. By means of the latter, a closing pin 28 is moved to open and/or close the injection valve 13.

Here, the injection valve 13 is triggered in a pulse-like manner. In this case, the open period of the injection valve 13 is shorter than the period between two openings of the injection valve 13.

It may be provided, in particular, that 4 different pulse frequencies can be set for different coolants and/or lubricants. In some embodiments, the period between two openings of injection valve 13 is adjusted in dependence on the viscosity of the coolant and/or lubricant. In this case, the open period of the injection valve 13 during a pulse remains constant. In the exemplary embodiment, a coolant and/or lubricant injection quantity of 29 g/h results in the transport air flow.

The chamber arrangement 8 also has an atomizer chamber 20, in the interior 21 of which the coolant and/or lubricant 4 is atomized. The interior 21 of the atomizer chamber 20 in this case forms part of the chamber arrangement interior 9. The atomizer chamber 20 is arranged downstream of the injection chamber 18. In principle, the coolant and/or lubricant 4 can be atomized when it is injected into the injection chamber 4. Here, however, it is at least further atomized in the atomizer chamber 20. In this way, a homogeneous aerosol can be generated for cooling and/or lubricating the chip-removing machining process.

To further improve the quality of the aerosol to be generated, the injection chamber 18 and the atomizer chamber 20 may be separated from each other by a nozzle 22, in particular for atomizing the first compressed-air stream 11 with the possibly injected coolant and/or lubricant 4. Here, the first compressed-air stream 11, possibly with the injected coolant and/or lubricant, flows through the nozzle 22 from the injection chamber 18 into the atomizer chamber 20. The injected coolant and/or lubricant 4 is driven by the first compressed-air stream 11 through the nozzle opening 23 of the nozzle 22. The first compressed-air stream 11 thus conveys the injected coolant and/or lubricant 4 through nozzle 22 and thus atomizes it. Here, the nozzle 22 also has an interior 24. Here, the interior 24 of the nozzle 22, the interior 18 of the injection chamber 18 and the interior 21 of the atomizer chamber 20 together form the chamber arrangement interior 9.

Here, the nozzle opening 23 is substantially round. In principle, however, it may also have a different geometry. Its maximum passage opening width can be a maximum of 0.5 mm, a maximum of 0.3 mm, or 0.2 mm.

In the exemplary embodiment, the coolant and/or lubricant 4 is conveyed from the first compressed-air stream 11 through nozzle 22, and the coolant and/or lubricant 4 is atomized into the second compressed-air stream 16.

In the exemplary embodiment, the second compressed-air stream 16 flows through a plurality of second partial supply ducts 15a, here four, into the atomizer unit 2. These are combined, here, in the atomizer unit 2, to form a second main supply duct 15b. Here, the supply to the atomizer chamber 20 is effected in a radial direction around the nozzle 22. In various embodiments, at least one directional component of the first compressed-air stream 11, when entering the atomizer chamber 20, runs in the longitudinal direction of the nozzle opening 23. Here, the second compressed-air stream 11, immediately before entering the atomizer chamber 20, runs substantially parallel to the longitudinal direction of the nozzle opening 23. Here, when the transport stream 17 has been established, the volume flow of the second compressed-air stream 16 is greater than the volume flow of the first compressed-air stream 11, such as greater by a factor of at least 2 than the volume flow of the first compressed-air stream 11, such as greater by a factor of at least 5 than the volume flow of the first compressed-air stream 11, such as greater by a factor of at least 10 than the volume flow of the first compressed-air stream 11.

FIG. 2 shows the proposed minimal-quantity lubrication system 3. The exemplary embodiment shows the atomizer unit 2 described above. In addition, a coolant and/or lubricant source 29 is provided to supply the injection valve 13 with coolant and/or lubricant 4. Here, the coolant and/or lubricant 4 is liquid. Here, it is provided by the coolant and/or lubricant source 29 at a pressure of 50 to 250 bar, 80 to 220 bar, 100 to 200 bar, 130 to 170 bar, or here 150 bar. Such high pressures allow a good distribution of the coolant and/or lubricant 4 already during injection into the injection chamber 18.

The minimal-quantity lubrication system 3 also has a compressed-air source arrangement 30 for supplying the first and/or second supply duct 10, 15 with compressed air. A single compressed-air source is provided to supply both supply ducts with compressed air. Alternatively, however, two separate compressed-air sources may form the compressed-air source arrangement, and a first compressed-air source supplies the first supply duct with compressed air, and a second compressed-air source supplies the second supply duct with compressed air. Here, the compressed air is produced from ambient air.

As shown in FIG. 2, the minimal-quantity lubrication system 3 of the exemplary embodiment has a compressed-air source that provides the compressed air for the first compressed-air stream 11 and the second compressed-air stream 16. In various embodiments, here a booster 31, which increases the pressure of the first compressed-air stream by means of post-compression, is provided in the supply line for the first compressed-air stream 11.

It is thus that the first supply duct 10 can be supplied with compressed air at a higher pressure than the second supply duct 15. Here, the pressure difference of the pressure provision is from 2 to 8 bar, from 4 to 6 bar, or substantially 5 bar. In various embodiments, when the transport stream has been established, the first supply duct 10 is supplied with compressed air at a pressure of 3 to 8 bar, 4 to 7 bar, or in the exemplary embodiment of 6 bar, and/or the second supply duct 15 is supplied with compressed air at a pressure of 8 to 15 bar, 9 to 13 bar, or in this case 11 bar, when the transport stream 17 has been established. In various embodiments, the pressure of the first and second compressed-air stream can be set separately.

The proposed machining installation 1 has a tool 5, and a minimal-quantity lubrication system 1 having an atomizer unit 2. The machining installation 1 has a spindle 32 having a tool receiver 1a for receiving the tool 5. Here, the machining installation 1 has an end effector 34, in which the spindle 32 is arranged.

Here, the compressed-air source arrangement and/or the coolant and/or lubricant source 29 are/is in this case arranged at a distance from the end effector 34.

The machining installation 1 can be a drilling machine, in this case a drilling/riveting machine. In the exemplary embodiment the tool 5 is a drill bit. Here, the spindle 32 is a constituent part of a drilling unit 33 of the end effector 34. In addition, the end effector 34 may have a riveting unit 35 for placing rivet elements in a hole drilled by means of the drilling unit 33.

The machining installation 1 also has a control arrangement 26 for controlling the machining installation 1 and the minimal-quantity lubrication system 3 and thus the chip-removing machining process. Here, the control arrangement 26 has a machining installation control and possibly a minimum-quantity lubrication system control. The machining installation control can be a PLC control. It controls the chip-removing machining process. Here, the minimal-quantity lubrication system control receives coolant and/or lubricant parameters from the machining installation control. In dependence on these parameters, the minimal-quantity lubrication system 3, in particular the atomizer unit 2 of the minimal-quantity lubrication system 3, is controlled, in particular the addition of the coolant and/or lubricant 4 and the transport stream 17.

As shown in FIG. 1, here the atomizer unit 2 is located outside of the spindle 32. This is necessary, in particular, in the case of small and compact spindles 32. An arrangement of the atomizer unit 2 in spindle 32 is usually not possible for reasons of structural space. Here, the continuation duct 12 runs from the atomizer unit 2, through the spindle 32 and the tool 5, to the machining location 7.

The atomizer unit 2 is arranged in front of the spindle 32 in the direction of flow of the transport stream 17. In various embodiments, the flow path W from the atomizer unit 2 to the spindle 32 is less than 50 cm, less than 20 cm, or less than 10 cm. The closer the atomizer unit 2 is to the spindle 32, the shorter are the latencies that can be achieved for switching the aerosol on and/or off.

In various embodiments, it is the case that the spindle axis S intersects the injection valve 13 and/or the nozzle 22, such as that the spindle axis S can be coaxial with the central axis $M_E$ of the injection valve and/or with the central axis $M_D$ of the nozzle opening 23 of the nozzle 22. This allows particularly good guiding of the aerosol in the continuation duct 12. Alternatively, the spindle axis S and the centre axis $M_E$ and/or the central axis $M_D$ may also be arranged non-coaxially. In various embodiment, they are then realized parallel to each other, or their point of intersection can be arranged at a maximum distance of 20 cm, or 10 cm, from the atomizer unit.

The chip-removing machining process is to be described in greater detail in the following. The transport stream 17 can be established before or during a chip-removing machining process, and that coolant and/or lubricant 4 be added to the established transport stream 17, forming an aerosol with the transport stream 17.

The aerosol can then be transported in a very simple manner by the transport stream 17 to the machining location 7. The establishment of the transport stream 17 before the injection of the coolant and/or lubricant allows a very precise control of the addition of the coolant and/or lubricant and of its transport to the machining location 7, and thus a very precise control of the cooling, or lubrication. This allows small quantities of coolant and/or lubricant 4 to be applied at exactly the time-points at which the coolant and/or lubricant 4 is actually needed or offers an advantage.

In the exemplary embodiment, the coolant and/or lubricant 4 is added only after the formation of a constant transport stream 17, i.e. when transport stream 17 has formed in a quasi-stationary manner. This makes it possible to determine very precisely the time span after which the aerosol emerges from at least one outlet opening 5a of the tool 5 after the injection valve 13 for injecting the coolant and/or lubricant 4 has been triggered. Particularly, the coolant and/or lubricant 4 is added to the transport stream 17 in such a manner that the aerosol emerges from the at least one outlet opening 5a only after at least one outlet opening 5a of the tool 5a has been immersed, in particular fully immersed, into the workpiece 6.

Figure 4:
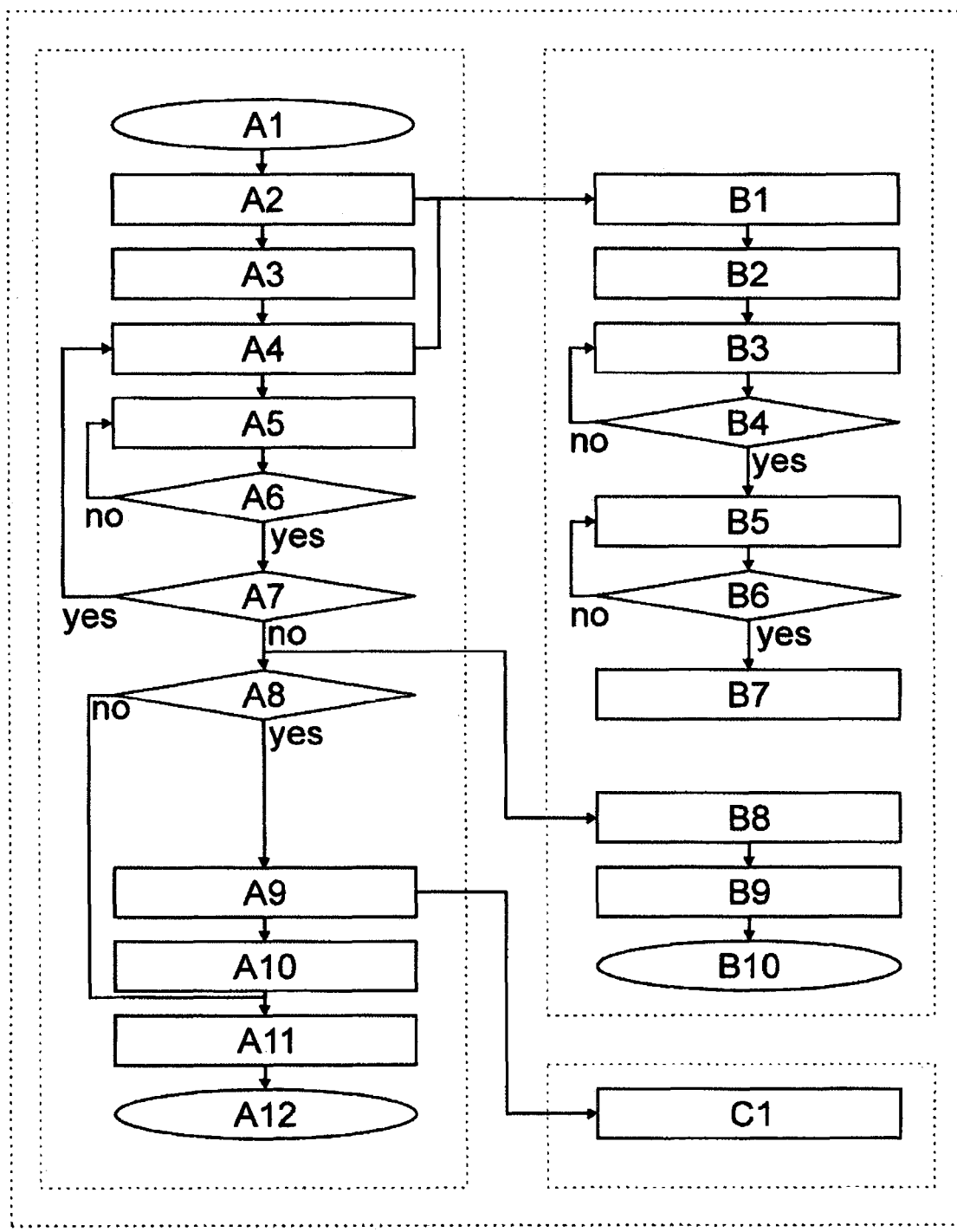

Here, the chip-removing machining process, in the embodiment of FIG. 4, a drilling process begins with the loading of the machining parameters for the upcoming chip-removing machining process (A2: start chip-removing machining process).

The machining parameters may be, for example, the tool 5 to be used and/or the machining geometry, here for example the geometry data of the drill hole, and/or a start position, and/or a tool feed, and/or a spindle rotational speed, and/or workpiece parameters such as, for example, workpiece material composition and/or workpiece geometry and/or workpiece alignment, and/or coolant and/or lubricant parameters. Here, a cooling and/or lubrication process can be started by means of the minimum-quantity lubrication system 3 (B1: transfer coolant and/or lubricant parameter) by and/or with the transfer of at least one coolant and/or lubricant parameter. This is described in greater detail below. Here, following the loading of the machining parameters, the tool 5 is moved to the start position (A3: move to start position).

Here, the start position is understood to be the position from which tool 5 is approached for cutting in a machining mode (see FIG. 5a). The start position is usually approached in rapid traverse, such as with a subsequent fine positioning. During the rapid traverse and the subsequent fine positioning, the machining installation 1 is in a positioning mode.

In the exemplary embodiment of FIG. 4, the machining parameters for the chip-removing machining process, in particular the next layer of workpiece 6, are now activated. Here, the spindle 32 is accelerated to the spindle rotational speed and a feed traverse profile for the tool 5 is activated (A4: activation of chip-removing machining parameters).

This is followed by machining in the chip-removing machining process. Here, drilling is performed up to one end-of-layer of the workpiece 6 (A5: drilling to end-of-layer). Upon attainment of an end-of-layer of the workpiece 6 (A6: end-of-layer attained?), a query is made as to whether the workpiece 6 has a further layer (A7: further layer). If it has a further layer, the chip-removing machining parameters are activated for this further layer, and to that extent the system returns to the activation of the chip-removing machining parameters (step A4). To that extent, coolant and/or lubricant parameters can be transferred again for the next layer, in particular to the minimal-quantity lubrication system 3. The cooling and/or lubrication process is then adapted accordingly. If the workpiece 6 has no further layer, the cooling and/or lubrication process is terminated according to a stop routine (B8 to B10).

Here, afterwards a query is made as to whether a counterbore operation is to be performed (A8: counterbore operation?). If this is the case, a counterbore routine follows. If this is not the case, tool 5 is retracted from workpiece 6, in this case the drill is withdrawn from the drilled hole (A11: withdrawal of the tool). This completes the hole and the chip-removing machining process is ended (A12: end of chip-removing machining process).

If a counterbore operation remains to be performed, a fast travel (i.e. a further feed at increased feed rate) to a counterbore entry is performed and the counterbore operation is started. The counterboring is performed with a counterbore portion 5*b* of tool 5. Here, the fast travel to the counterbore entry triggers a counterbore cooling and/or lubricating process (A9: fast travel to counterbore entry). Here, the cooling and/or lubrication of the counterbore operation is performed by means of an external minimum-quantity lubrication. Here, the minimal-quantity lubrication system 3 has an external atomizer unit 36, which is located outside of the spindle 32 and whose external continuation duct 37 leads past the spindle 32 to the machining location 7. In various embodiments, the external atomizer unit 36 has the same features as the internal atomizer unit 6. In various embodiments, they are of identical structural design.

Coolant and/or lubricant parameters may likewise be transferred for external minimum-quantity lubrication (C: external minimum-quantity lubrication). When the counterbore operation is completed (A10: end of counterbore operation), the tool 5 is withdrawn from the drilled hole, as already described (A11: withdrawal of the tool) and the chip-removing machining process is completed (A12: end of chip-removing machining process).

Here, the cooling and/or lubrication process during the chip-removing machining process is as follows.

In this case, the cooling and/or lubrication process can be started within the control arrangement 26 by transfer of at least one coolant and/or lubricant parameter (B1: transfer coolant and/or lubricant parameter).

This activates a, in particular internal, supply of lubricant. Here, an internal supply of lubricant is understood to be the minimal-quantity lubrication system 3 with the atomizer unit 2, which supplies the machining location 7 with coolant and/or lubricant 4 through the tool 5 (B2: activation of the internal minimal-quantity lubrication).

In various embodiments, settings are now effected for the transport stream 17 and/or a first compressed-air stream 11 and/or a second compressed-air stream 16 (B3: setting of the transport stream). Here, these settings are based on the transferred coolant and/or lubricant parameters.

It has been found to be advantageous if, at a transport-air trigger time-point, the control arrangement 26 effects the establishment of the transport stream 17, in particular by triggering a compressed-air valve arrangement 38, based on a predefined event, the transport air event, of the chip-removing machining process, or at a predicted predefined future event, the predicted transport air event, of the chip-removing machining process. In this way, the establishment of the transport stream 17 can be triggered particularly well and precisely to the requirement in the chip-removing machining process.

The transport event or predicted transport event may be a predetermined time distance and/or geometrical distance of the tool 5 from the workpiece 6, and/or the first contact of the tool 5 with the workpiece 6, and/or the imminent immersion of the at least one outlet opening of the tool 5 in the workpiece 6, and/or the attainment of a predetermined immersion depth of the outlet opening 5*a* of the tool 5 in the workpiece 6, and/or the complete immersion of the at least one outlet opening 5*a* of the tool 5 in the workpiece 6.

In the exemplary embodiment of FIG. 4, the transport air event is the attainment of a predetermined time distance of the tool 5 from the workpiece 6 (B4: attainment of the predetermined distance of the tool from the workpiece). This corresponds to the relative position of the tool 5 and the workpiece 6 in FIG. 5*b*). In this case, the attainment of a time distance of 50 ms between the tool 5, in this case the drill-bit tip, and the workpiece 6 is provided as a transport air event. This distance is easily determined due to the known feed rate. When this event occurs, the transport stream has been established (B5: establishment of the transport stream). The transport stream takes between 15 and 40 ms to establish, between 20 and 30 ms, or in this case 25 ms.

Here it is provided, in addition or alternatively, that at an injection trigger time-point the control arrangement 26 triggers the injection valve 13 to add the coolant and/or lubricant 4 to the transport stream 17 on the basis a predefined event, the injection event, of the chip-removing machining process, or at a predicted predefined future event, the predicted injection event, of the chip-removing machining process. On this basis, the coolant and/or lubricant 4 can be transported to the machining location 7, matched with particular precision to the chip-removing machining process and the position of the tool 5. Here, the transport-air trigger time-point precedes the injection trigger time-point. In various embodiments, the transport-air trigger time-point is at least between 10 and 500 ms, between 12 and 200 ms, between 15 and 100 ms, between 18 and 50 ms, or here 25 ms, before the injection trigger time-point.

The injection event or the predicted injection event may be a predetermined time distance and/or geometrical distance of the tool 5 from the workpiece 6, and/or the first contact of the tool 5 with the workpiece 6, and/or the imminent immersion of the at least one outlet opening 5*a* of the tool 5 in the workpiece 6, and/or the attainment of a predetermined immersion depth of the outlet opening 5*a* of the tool 5 in the workpiece 6, and/or the complete immersion of the at least one outlet opening of the tool 5 in the workpiece 6.

Here, the injection event is the first contact of the tool 5, here the drill bit, with workpiece 6, i.e. the tip of the drill bit meeting the workpiece 6 (B6: contact of tool with workpiece). This is shown in FIG. 5*c*). The injection valve 13 for injecting the coolant and/or lubricant 4 is triggered at this time-point, and the coolant and/or lubricant is injected (B7: injection of the coolant and/or lubricant). The time between the triggering of the injection valve 13 and the emergence of the coolant and/or lubricant 4 can be a maximum of 15 ms, in this case a maximum of 10 ms.

The events (transport air event, predicted transport air event, injection event, predicted injection event) serve here, as it were, as triggers, or predicted triggers, for the establishment of the transport stream 17, or for the triggering of the injection valve 13 to start injection of the coolant and/or lubricant 4.

Here, as indicated by the above explanation, the injection event, or the predicted injection event, and the transport air event, or the predicted transport air event, are defined differently. However, both may also be defined in the same way, in which case a time offset, in particular a predefined time offset, is provided between the transport-air trigger time-point and the injection trigger time-point.

In various embodiments, the coolant and/or lubricant 4 is added to the transport stream 17 in such a manner that the aerosol emerges from the at least one outlet opening 5*a* only after the immersion, in particular complete immersion, of at least one outlet opening 5*a* of the tool 5 into the workpiece 6. In the exemplary embodiment, the addition is effected in such a manner that the aerosol emerges from the at least one outlet opening 5*a* only after the complete immersion of all outlet openings of the tool 5. A corresponding relative position is shown in FIG. 5*d*).

It may also be provided, however, that the triggering event is more specifically adapted to workpiece 6, or to a relative position between the workpiece 6 and the tool 5.

A latency, between the triggering of the injection valve 13 and the emergence of the aerosol from an outlet opening 5a of tool 5, may be determined as part of the method.

For example, this may be measured and stored in the control arrangement 26. However, such a latency may also be determined, in particular calculated, by the control arrangement 26.

In particular, 6 different latencies may be determined for different tools. In various embodiments, the control arrangement 26 determines the latency based on a machining-installation-specific value and a tool-specific value and, if appropriate, a coolant- and/or lubricant-specific value.

In various embodiments, the latency is less than or equal to 50 ms, less than or equal to 40 ms, or less than or equal to 30 ms.

For the purpose of adding the coolant and/or lubricant 4, the emergence thereof is controlled from the injection valve 13. The coolant and/or lubricant 4 is atomized upon or following the emergence of the coolant and/or lubricant 4 from the injection valve 13.

Here, this is effected by means of a nozzle 2. The latter can be arranged downstream, in particular separately, from the injection valve 13 in the atomizer unit 2. The coolant and/or lubricant 4 may be already partially atomized beforehand by the injection valve 13 upon emergence from the latter.

Figure 5:
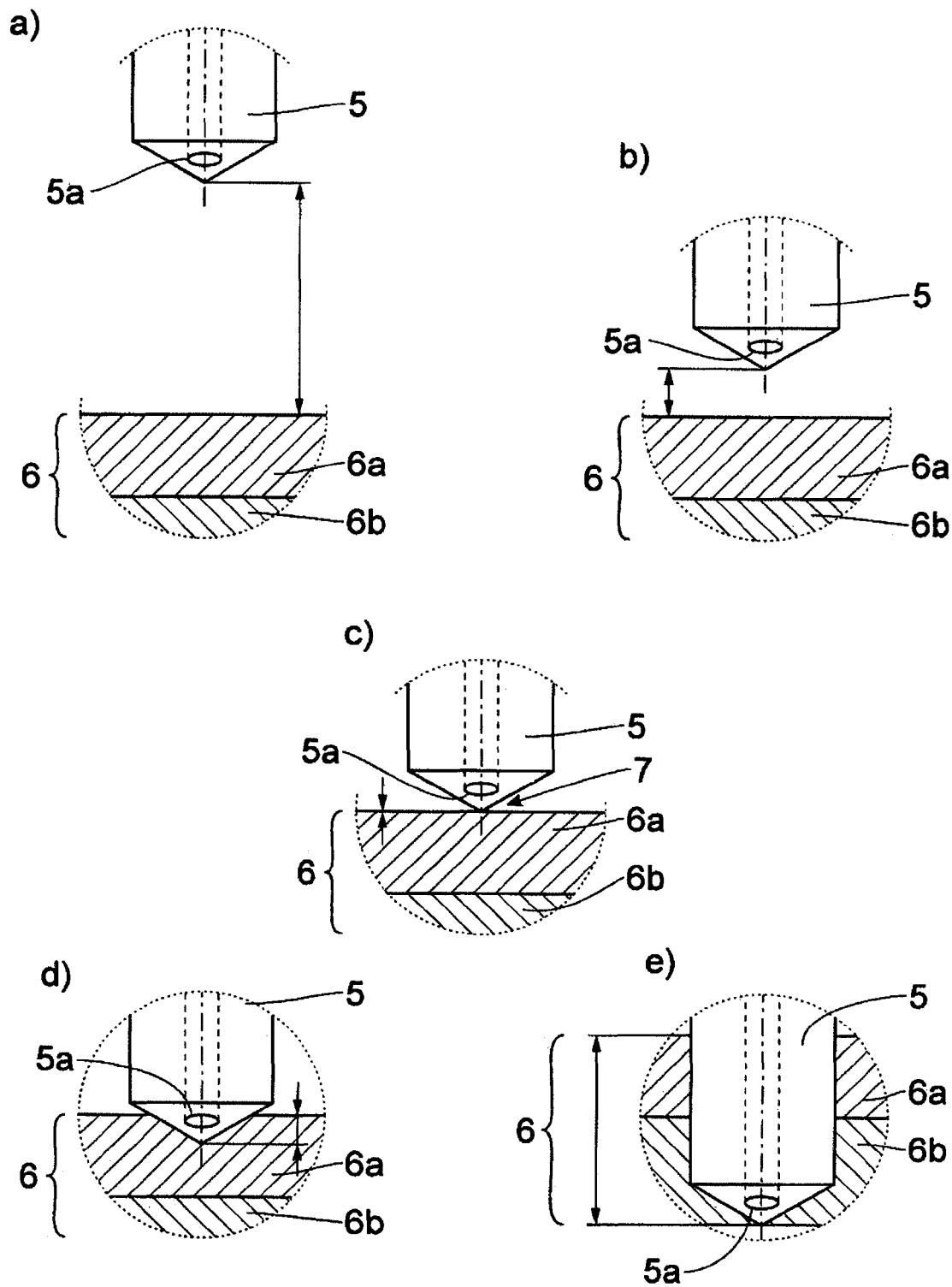

As shown in FIG. 5 and explained in greater detail below, the aerosol is generated by injection of the coolant and/or lubricant 4 into a first compressed-air stream 11, in particular by means of the injection valve 13, and, in some embodiments, by atomization of the compressed-air mixture of the injected coolant and/or lubricant 4 and the first compressed-air stream 11, in particular by nozzle 22. Here, the first compressed-air stream 11 and the second compressed-air stream 16 then form, if appropriate with the injected and/or atomized coolant and/or lubricant 4, the transport stream 17.

The coolant and/or lubricant 4 is added in a pulse-like manner to the established transport stream 17, in particular by means of the injection valve 13 and, if necessary, the nozzle 22, to form the aerosol. Here, during the pulse-like addition of the coolant and/or lubricant 4, the open period of the injection valve 13 is shorter than the period between two openings of the injection valve 13. For the purpose of injecting the coolant and/or lubricant 4, the injection valve 13 can be triggered with a trigger frequency of 5 to 100 Hz, 10 to 50 Hz, or here 35 Hz. The open period of the injection valve 13 can be less than 10 ms, less than 2 ms, less than 1 ms, less than 0.5 ms, less than 0.4 ms, or as in the exemplary embodiment 0.37 ms.

In some embodiments, in particular an operator can set and/or parameterize the minimum-quantity lubrication system 3 for a workpiece 6, in particular for each layer of the workpiece 6, in the chip-removing machining process. In this way, the cooling and/or lubrication can be adjusted for different layers, in particular for each layer, of the workpiece 6. Here, the setting and/or parameterization is effected before the start of the chip-removing machining process.

A layer of a workpiece 6 may be formed by a workpiece part 6a, 6b. In this case, the minimum-quantity lubrication system 3 may be set and/or parameterized for each workpiece part 6a, 6b.

Additionally or alternatively, a workpiece 6, in particular a workpiece part 6a, 6b, may consist of a plurality of layers. This may be, for example, a hybrid workpiece built up in layers. Then each layer of the workpiece 6, or workpiece part 6a, 6b, may form a layer of workpiece 6.

In various embodiments, the transport stream 17, in particular the pressure of the first compressed-air stream 11 and/or of the second compressed-air stream 16, and the coolant and/or lubricant quantity used can be set and/or parameterized, in particular by the operator. Here, the setting and/or parameterization is effected before the start of the chip-removing machining process. Here, on the one hand the pressure of the second compressed-air stream 16 is parameterized by the operator, and the control arrangement 26, in particular the minimum-quantity lubrication system control, sets the first and second compressed-air streams 11, 16 on the basis of the parameterization of the second compressed-air stream 16. Additionally or alternatively, the operator may parameterize the lubricant quantity. Here, the control arrangement 26, in particular the minimum-quantity lubrication system control, sets the pressure of the coolant and/or lubricant 4 and/or the triggering of the injection valve 13 on the basis of the parameterization of the lubricant quantity. Here, the triggering of the injection valve 13 is set by determination of the trigger frequency and/or the open period and/or a transient that describes a flutter status of the valve.

In the chip-removing machining process, the cooling and/or lubrication for a first layer of the workpiece 6 can be set differently than for a second layer of the workpiece 6. Additionally or alternatively, the addition of coolant and/or lubricant 4 may be stopped for individual layers of the workpiece 6, in particular if these layers are made of fiber composite material, in particular a carbon fiber reinforced plastic (CFRP).

In various embodiments, the control arrangement 26 provides for different open periods of the injection valve 13 in dependence on the viscosity of the coolant and/or lubricant being used at the particular time.

As also shown in FIG. 5, upon termination of the chip-removing machining process, the addition of coolant and/or lubricant 4 to the transport stream 17 is stopped first, and then the transport stream 17 is stopped. In various embodiments, the addition of the coolant and/or lubricant 4 is stopped when the tool 5 begins to emerge from workpiece 6, and/or when the tool 5, in this case the drilling head, has completely penetrated the workpiece 6, and/or when the tool 5 has attained a predetermined position relative to the workpiece 6.

In the exemplary embodiment, the stopping of the addition of coolant and/or lubricant 4 is effected when an end-of-layer, in particular the final end-of-layer, of the workpiece 6 is reached (B8: stopping of injection). This relative position of the tool 5 and the workpiece 6 is shown in FIG. 5e). In various embodiments, following the stopping of the addition of the coolant and/or lubricant 4 to the transport stream 17, the transport stream 17 is stopped only after a period of time, in particular a predetermined period of time (B9: wait for the predetermined period of time; B10: stop the transport stream). In this way, the aerosol still in the continuation duct 12 can still be transported out of it to a large extent. Here, the time from the stopping of the addition of the coolant and/or lubricant 4 to the transport stream 17 and the stopping of the transport stream 17 can be between 50 and 500 ms, between 200 and 300 ms, or here 250 ms.

In the exemplary embodiment, the chip-removing machining process is a drilling process for a first drill hole. Following this drilling process, a further drilling process may be performed for a second drill hole, in particular on the same workpiece 6. Here, the transport stream 17 is suspended and restarted between the two drilling processes, with the transport stream being established before or during the second drilling process, as a further chip-removing machining process, and the coolant and/or lubricant 4 being added by the injection valve 13 to the transport stream 17 established at least in the injection region, forming an aerosol with the transport stream 17. In various embodiments, between the two drilling processes, a rivet element from the machining installation 1 is placed in the first drill hole. Switching-off allows saving of energy. In addition, coolant and/or lubricant residues adhering to the continuation duct 12 are prevented from being blown out during the setting of the rivet element.

The invention claimed is:

1. An atomizer unit of a minimal-quantity lubrication system for cooling and/or lubricating a chip-removing machining process between a tool and a workpiece at a machining location,
wherein the atomizer unit comprises a chamber arrangement comprising a chamber arrangement interior, at least one first supply duct for supplying a first compressed-air stream into and through the chamber arrangement interior to a continuation duct, and an injection valve for injecting a coolant and/or lubricant into an injection region into the first compressed-air stream in the chamber arrangement interior,
wherein the atomizer unit comprises at least one second supply duct for supplying a second compressed-air stream into and through the chamber arrangement interior to the continuation duct,
wherein the atomizer unit is configured in such a manner that, downstream of the injection region, the second compressed-air stream combines with the first compressed-air stream and with the coolant and/or lubricant injected into the first compressed-air stream, to form a transport stream for transporting the injected coolant and/or lubricant, and wherein the transport stream is routed through the continuation duct to the machining location.

2. The atomizer unit as claimed in claim 1, wherein the chamber arrangement has an injection chamber, into the interior of which the coolant and/or lubricant is injected through the injection valve, and wherein the injection chamber comprises the injection region, and wherein the interior of the injection chamber forms part of the chamber arrangement interior,
and/or,
wherein the chamber arrangement has an atomizer chamber into the interior of which the coolant and/or lubricant is atomized, wherein the interior of the atomizer chamber forms part of the chamber arrangement interior.

3. The atomizer unit as claimed in claim 2, wherein the atomizer chamber is arranged downstream of the injection chamber.

4. The atomizer unit as claimed in claim 1, wherein the injection chamber and the atomizer chamber are separated from each other by a nozzle for atomization.

5. The atomizer unit as claimed in claim 4, wherein the first compressed-air stream flows through the nozzle from the injection chamber into the atomizer chamber or the first compressed-air stream conveys the injected coolant and/or lubricant through the nozzle.

6. The atomizer unit as claimed in claim 1, wherein the first compressed-air stream conveys the coolant and/or lubricant injected into it through the nozzle, and the coolant and/or lubricant is atomized.

7. The atomizer unit as claimed in claim 1, wherein the injection valve is a direct petrol injection valve.

8. The atomizer unit as claimed in claim 1, wherein the injection valve is triggered in a pulsed manner.

9. The atomizer unit as claimed in claim 1, wherein the passage opening width of the passage opening of the nozzle is a maximum of 0.5 mm.

10. A minimal-quantity lubrication system comprising an atomizer unit as claimed in claim 1, comprising a coolant and/or lubricant source for supplying the injection valve with coolant and/or lubricant, and comprising a compressed-air source arrangement for supplying the first and/or second supply duct with compressed air.

11. The minimal-quantity lubrication system as claimed in claim 10,
wherein the coolant and/or lubricant is provided by the coolant and/or lubricant source at a pressure of 50 to 250 bar,
and/or that compressed air is provided to the first supply duct at a pressure of 3 to 8 bar when the transport stream has been established,
and/or that compressed air is provided to the second supply duct at a pressure of 8 to 15 bar when the transport stream has been established.

12. The minimal-quantity lubrication system as claimed in claim 10,
wherein the first supply duct is supplied with compressed air at a higher pressure than the second supply duct, wherein the pressure difference of the pressure provision is at least 2 bar and not more than 8 bar.

13. A machining installation for chip-removing machining of a workpiece, wherein the machining installation has a tool and an atomizer unit as claimed in claim 1.

14. The machining installation as claimed in claim 13, wherein the machining installation comprises a spindle comprising a tool receiver, and that the continuation duct runs, in particular straight, from the atomizer unit, through the spindle and the tool, to the machining location.

15. The machining installation as claimed in claim 13, wherein the atomizer unit is arranged in front of the spindle in the direction of flow of the transport stream, wherein the flow path from the atomizer unit to the spindle is less than 50 cm.

16. The machining installation as claimed in claim 13, wherein the machining installation is a drilling machine and that the tool is a drill bit.

17. The machining installation as claimed in claim 13, wherein the machining installation comprises an end effector in which the spindle is arranged, and that the compressed-air source and/or the coolant and/or lubricant source are/is arranged at a distance from the end effector.

18. The atomizer unit as claimed in claim 1, wherein the first compressed-air stream conveys the coolant and/or lubricant injected into it through the nozzle, and the coolant and/or lubricant is atomized into the second compressed-air stream.

19. The atomizer unit as claimed in claim 1, wherein the injection valve is triggered in a pulse-like manner, wherein the open period of the injection valve is shorter than the time between two openings of the injection valve.

* * * * *